United States Patent [19]  
Koshiga et al.

[11] 4,145,594  
[45] Mar. 20, 1979

[54] METHOD FOR LONGITUDINALLY SEAM-WELDING PIPE-BLAND FOR WELDED STEEL PIPE FROM INSIDE ALONG GROOVE

[75] Inventors: Fusao Koshiga, Kawasaki; Jinkichi Tanaka; Itaru Watanabe; Motoaki Suzuki, all of Yokohama; Toshihiro Takamura, Kawasaki, all of Japan

[73] Assignee: Nippon Kokan Kabushiki Kaisha, Tokyo, Japan

[21] Appl. No.: 799,986

[22] Filed: May 24, 1977

[30] Foreign Application Priority Data  
Jun. 22, 1976 [JP] Japan .................................. 51-72779

[51] Int. Cl.² ............................................. B23K 09/12  
[52] U.S. Cl. ................................... 219/61; 219/60 R; 291/122; 219/123; 219/137 R  
[58] Field of Search ................ 219/60 R, 61, 66, 122, 219/123, 135, 137 R

[56] References Cited  
U.S. PATENT DOCUMENTS

| | | | |
|---|---|---|---|
| 2,564,396 | 8/1951 | Darner | 219/60 A |
| 2,907,866 | 10/1959 | Yenni | 219/137 R |
| 2,911,517 | 11/1959 | Armstrong | 219/137 R X |
| 3,171,944 | 3/1965 | Linnander | 219/137 R |
| 3,549,856 | 12/1970 | Saenger | 219/137 R |

FOREIGN PATENT DOCUMENTS  
2162567 7/1973 France ........................................ 219/61

Primary Examiner—Richard R. Kucia  
Attorney, Agent, or Firm—Flynn & Frishauf

[57] ABSTRACT

In longitudinally seam-welding a pipe-blank for welded steel pipe from the inside along a groove by the metal arc welding process which comprises using direct electric current supplied to a plurality of consumable electrodes in tandem through at least one current supply cable as the welding current, an even number of consumable electrodes are used; half of said even-numbered consumable electrodes are connected in the reverse-polarity manner, i.e., to be positive in polarity, and are used as leading electrodes, and the remaining half are connected in the straight-polarity manner, i.e., to be negative in polarity, and are used as trailing electrodes; the GMA welding process is applied on the side of said reverse-polarity consumable electrodes which are the leading electrodes; and the submerged-arc welding process is applied on the side of said straight-polarity consumable electrodes which are the trailing electrodes; thereby preventing magnetization of said pipe-blank and the resulting magnetic arc blow of the welding arc by causing lines of magnetic force produced by said direct electric currents for welding flowing through said current supply cables introduced into said pipe-blank to cancel each other, and also preventing spattering of molten droplets from said straight-polarity consumable electrodes.

3 Claims, 8 Drawing Figures

METHOD FOR LONGITUDINALLY SEAM-WELDING PIPE-BLAND FOR WELDED STEEL PIPE FROM INSIDE ALONG GROOVE

FIELD OF THE INVENTION

The present invention relates to an improvement in the method for longitudinally seam-welding a pipe-blank for welded steel pipe from the inside along a groove by the metal arc welding process comprising using direct electric current supplied to a plurality of consumable electrodes arranged in tandem through at least one current supply cable as the welding current, said improvement giving a beautiful and sound weld free from welding defects.

BACKGROUND OF THE INVENTION

Conventionally, in longitudinally seam-welding, for manufacturing a welded steel pipe, the groove of an O-shaped plate (hereinafter called "pipe-blank"), formed into a cylindrical shape by a forming process such as the U-O process (abbreviation of the U-ing/O-ing process) and the bending roll process, as shown in the schematic side view given in FIG. 1 for example, it is the usual practice of welding to employ an inside welding machine equipped with a welding torch 1 attached to the free end of a boom 2 having a length at least equal to that of a pipe-blank 3 to be welded, the fixed end of said boom 2 being fixed to a carriage 4; to insert said boom 2 into said pipe-blank 3 in advance; and, to longitudinally seam-weld said pipe-blank 3 from the inside along the groove with a consumable electrode 5 fed through said welding torch 1, while moving said boom 2 by said carriage 4, together with a current supply cable 9 serving to supply welding current to said consumable electrode 5, in the withdrawal direction from said pipe-blank 3, i.e., in the welding direction as indicated by an arrow in FIG. 1. An inside welding machine equipped with two welding torches 1 and 1 and two consumable electrodes 5 and 5, leading and trailing, is represented in FIG. 1. However, an inside welding machine may have one welding torch and one consumable electrode, or it may be provided with more than two welding torches and more than two consumable electrodes.

In the aforementioned conventional welding method of a pipe-blank, when adopting a welding process comprising using direct electric current as the welding current with a consumable electrode as the anode, such as the reverse-polarity GMA welding process (GMA welding process is the abbreviation of the gas metal arc welding process which comprises carrying out welding while shielding a molten metal and a welding arc produced in the space between the base metal and the consumable electrode from open air with shielding gases such as an inert gas and a carbon dioxide gas), as shown in the partially enlarged schematic drawing given in FIG. 2, the welding arc 6 from the consumable electrode 5 is deflected toward the upstream side of the welding direction indicated by an arrow in the drawing, i.e., in the opposite direction to that of welding, and takes the form as if it is drawn in by the molten metal 7. When the welding arc 6 takes the form as if it is drawn in by the molten metal 7 as mentioned above, the plasma jet stream produced at the tip of the consumable electrode 5 is also deflected toward the molten metal 7 and acts on said molten metal 7 as a dynamic pressure. This pushes said molten metal 7 away toward the upstream side of the welding direction, i.e., in the opposite direction to that of welding. As a result, the space below the consumable electrode 5 becomes substantially dry without molten metal, thus impairing the affinity between molten droplets from the consumable electrode 5 and the base metal at the groove of the pipe-blank 3. Welding defects such as undercut of bead, humping bead and lack of fusion of base metal thus tend to easily occur. In addition, frequent occurrence of boiling and spattering in the molten metal 7 tends to result in a deteriorated appearance of the weld bead. When the welding arc 6 is deflected as described above, furthermore, the tip of the consumable electrode 5 is melted only on one side as shown in FIG. 2. Under such circumstances, the transfer mode of molten droplets from the consumable electrode 5 cannot be a desirable spray transfer, but takes an undesirable mixed form of globular transfer and short-circuit transfer. As a result, coarse spatters are splashed with a crackling short-circuiting noise and are deposited on the weld bead surface, thus leading to a deteriorated appearance of the weld bead. What is worse, splashed spatters are deposited on the opening at the tip of the shielding nozzle (not shown in the drawing) of the welding torch to disturb the gas shield and entangle the air. In this case, it may practically be impossible to carry out welding.

The above-mentioned deflection of the welding arc toward the upstream side of the welding direction, i.e., in the opposite direction to that of welding and the resulting irregular weld bead and welding defects are not limited only in the case of the conventional GMA welding process, but occur also in the case of the submerged-arc welding process using direct electric current as the welding current. In both cases, it has been difficult to obtain a beautiful and sound weld free from welding defects.

The irregular weld bead and welding defects such as undercut of bead, humping bead, lack of fusion of base metal and spattering, observed in longitudinally seam-welding a pipe-blank for welded steel pipe from the inside along a groove by the conventional welding process as mentioned above, is attributable to the deflection of a plasma jet stream toward a molten metal caused by the deflection of a welding arc, and said deflection of the welding arc is brought about by a line of magnetic force produced by the direct electric current for welding flowing through a current supply cable introduced into the pipe-blank.

More specifically, for instance, in longitudinally seam-welding a pipe-blank for welded steel pipe from the inside along a groove by the conventional reverse-polarity GMA welding process comprising using direct electric current as the welding current with a consumable electrode as the anode, direct electric current for welding flows, as shown in the partial cutaway schematic side view given in FIG. 3, in the oposite direction to that of welding indicated by an arrow in the drawing, through a current supply cable 9 introduced into the pipe-blank 3. Therefore, a line of magnetic force 10, which is clockwise as viewed from the right-hand side of the drawing, is produced by said direct electric current, and a strong magnetic field is formed around said current supply cable 9. As a result, said pipe-blank 3 is strongly magnetized in the same clockwise direction 11 as that of the line of magnetic force 10 by said magnetic field, thus causing leakage of a strong line of magnetic force from the groove of said pipe-blank 3, and a strong magnetic field is formed at said groove. When welding a groove where such a strong magnetic field is formed, the welding arc from a consumable electrode 5, which is a flow of charged corpuscle, is deflected by said strong magnetic field at the groove. This phenomenon is called the magnetic arc blow of the welding arc.

The relation between the direction of the electric current flowing through a welding arc, the magnetizing direction at the groove of a pipe-blank and the direction of the force acting on said welding arc at said groove is illustrated in the vector diagrams of FIGS. 4A and 4B. In these drawings, A is the direction of the electric current flowing in the welding arc 6 through the consumable electrode 5; B is the magnetizing direction at the groove of the pipeblank 3; C is the welding direction; and F is the direction of the force acting on said welding arc 6. As shown in FIGS. 4A and 4B, the direction F of the force acting on the welding arc 6 is the same as that of the direct electric current for welding flowing through the current supply cable 9 (refer to FIG. 3) and is opposite to the welding direction C. As described above with reference to FIG. 2, therefore, the welding arc 6 is deflected toward the upstream side of the welding direction C, i.e., in the opposite direction to that of welding C, thus resulting in such irregular weld bead and welding defects as undercut of bead, humping bead, lack of fusion of base metal and spattering.

The above-mentioned magnetic arc blow of the welding arc is widely observed when applying the arc welding process using direct electric current as the welding current.

SUMMARY OF THE INVENTION

An object of the present invention is therefore to provide an improvement in the method for longitudinally seam-welding a pipe-blank for welded steel pipe from the inside along a groove by the metal arc welding process which comprises using direct electric current supplied to a plurality of consumable electrodes in tandem through at least one cable as the welding current, said improvement being capable of giving a beautiful and sound weld free from welding defects.

A principal object of the present invention is, in such a process, to prevent magnetization of said pipe-blank and the resulting magnetic arc blow of the welding arc by causing lines of magnetic force produced by said direct electric current for welding flowing through said cables introduced into said pipe-blank to cancel each other, and also to prevent spattering of molten droplets from the straight-polarity consumable electrodes.

In accordance with one of the features of the present invention, there is provided an improvement in the welding method which comprises applying the metal arc welding process comprising using direct electric current supplied to a plurality of consumable electrodes in tandem through at least one current supply cable as the welding current, and longitudinally seam-welding a pipe-blank for welded steel pipe from the inside along a groove with said respective consumable electrodes fed through a plurality of welding torches in tandem, while moving a boom through said pipe-blank relative thereto in the same direction as that of welding, said boom being equipped with said welding torches at the free end thereof and having a length at least equal to that of said pipe-blank; said improvement being characterized by:

using an even number of, and at least two, consumable electrodes; pipe-blank half of said at least two even-numbered consumable electrodes in the reverse-polarity manner, i.e., to be positive in polarity and using them as leading electrodes, and connecting the remaining half in the straight-polarity manner, i.e., to be negative in polarity and using them as trailing electrodes; applying the GMA welding process on the side of said reverse-polarity consumable electrodes which are the leading electrodes; and applying the submerged-arc welding process on the side of said straight-polarity consumable electrodes which are the trailing electrodes; thereby preventing magnetization of said pipe-blank and the resulting magnetic arc blow of the welding arc by causing lines of magnetic force produced by said direct electric current for welding flowing through said cables introduced into said pipe-blank to cancel each other, and also preventing spattering of molten droplets from said straight-polarity consumable electrodes.

DETAILED DESCRIPTION OF PREFERRED EMBODIMENTS

Figure 1:
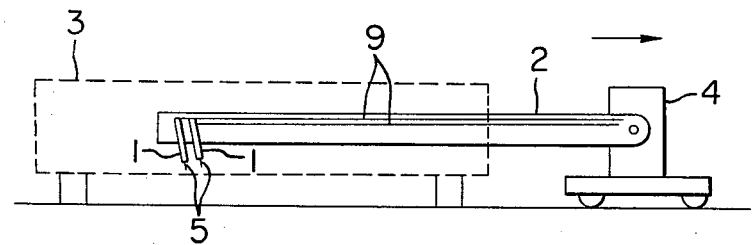
FIG. 1 is a schematic side view illustrating a conventional method for longitudinally seam-welding a pipe-blank for welded steel pipe from the inside along a groove and an apparatus for the implementation thereof.
Figure 2:
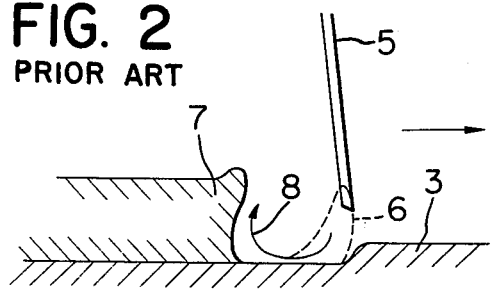
FIG. 2 is a partially enlarged schematic drawing illustrating a form of welding in the conventional reverse-polarity GMA welding process comprising using direct electric current as the welding current with a consumable electrode as the anode.
Figure 3:
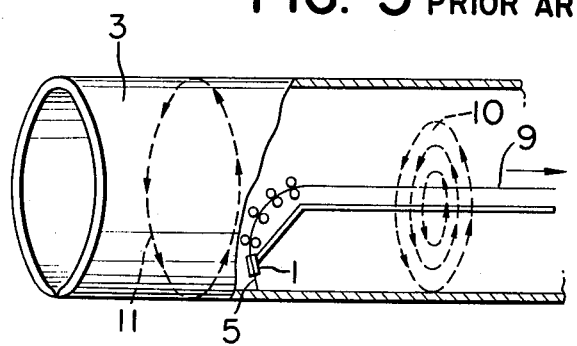
FIG. 3 is a partial cutaway schematic side view illustrating a form of welding in longitudinally seamwelding a pipe-blank for welded steel pipe from the inside along a groove by said conventional reverse-polarity GMA welding process.
Figure 4A:
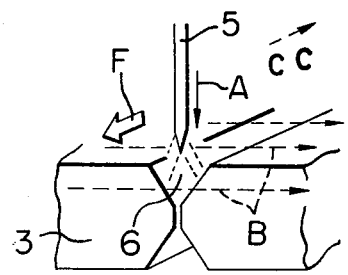
FIG. 4A is a vector diagram illustrating the relation between the direction of the electric current flowing through a welding arc, the magnetizing direction at the groove of a pipe-blank for welded steel pipe, and the direction of the force acting on said welding arc at said groove in said conventional reverse-polarity GMA welding process.
Figure 4B:
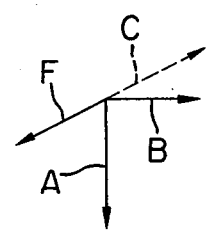
FIG. 4B is also a vector diagram illustrating the relation between the direction of the electric current flowing through a welding arc, the magnetizing direction at the groove of a pipe-blank for welded steel pipe, and the direction of the force acting on said welding arc at said groove in said conventional reverse-polarity GMA welding process.

In U.S. Pat. application Ser. No. 772,592, for the purpose of prevention of the aforementioned magnetization of the pipe-blank and the resulting magnetic arc blow of the welding arc, there is proposed a method for longitudinally seam-welding a pipe-blank for welded steel pipe from the inside along a groove, which comprises: applying the metal arc welding process comprising using direct electric current supplied to a plurality of consumable electrodes in tandem through a current supply cable as the welding current; using at least two even-numbered consumable electrodes; connecting half of said at least two even-numbered consumable electrodes in the reverse-polarity manner, i.e., to be positive in polarity, and connecting the remaining half in the straight-polarity manner, i.e., to be negative in polarity; and longitudinally seam-welding said pipe-blank from the inside along said groove with said respective consumable electrodes fed through a plurality of welding torches in tandem, while moving a boom through said pipe-blank relative thereto in the same direction as that of welding, said boom being equipped with said welding torches at the free end thereof and having a length at least equal to that of said pipe-blank; thereby preventing magnetization of said pipe-blank and the resulting magnetic arc blow of the welding arc by causing lines of magnetic force produced by said direct electric current for welding flowing through said cable introduced into said pipe-blank to cancel each other.

The metal arc welding process referred to above is a welding process, well known to a person having ordinary skill in the art, which comprises, with the use of heat of a welding arc produced between a base metal and a consumable electrode, melting said consumable electrode from the tip thereof and conducting welding with molten droplets from said consumable electrode.

According to the above-mentioned method, it is certain that a beautiful and sound weld free from welding defects can be obtained by the prevention of the occurrence of the magnetization of a pipe-blank and the resulting magnetic arc blow of the welding arc, in longitudinally seam-welding the pipe-blank from the inside along the groove.

In carrying out this method, however, although no problem is posed on the side of the consumable electrode connected in the reverse-polarity manner, i.e., to be positive in polarity, on the side of the consumable electrode connected in the straight-polarity manner, i.e., to be negative in polarity, the strong pushing-up force intrinsic to a straight-polarity welding arc blows off molten droplets from said straight-polarity consumable electrode to above the tip of said consumable electrode in the form of spatters, which are deposited on the weld bead surface and the surroundings, thus sometimes deteriorating the appearance of the weld bead. This has sometimes caused issues in manufacturing welded steel pipes for pipe-line under particularly strict requirement for a satisfactory weld bead surface quality. Furthermore, in carrying out a welding continuously for a long time, said spatters are deposited on the opening of the shielding nozzle, disturb the smooth flow of shield gas and impair the stability of welding arc. In extreme cases, entangled air even caused coarse bubbles in molten metal.

We have made further studies in order to solve such difficulties as mentioned above. As a result, it has been found that the appearance of a weld bead can be drastically improved, in the above-mentioned welding method in which leading and traling consumable electrodes are connected reversely in polarity with respect to each other, by using the reverse-polarity consumable electrode as the leading electrode, applying the GMA welding process on the side of said reverse-polarity consumable electrode, using the straight-polarity consumable electrode which has posed a problem in GMA welding process as the trailing electrode, and applying the submerged-arc welding process on the side of said straight-polarity consumable electrode.

The submerged-arc welding process referred to above is a welding process, well known to a person having ordinary skill in the art, which comprises accumulating a granular flux on a base metal in advance and carrying out the metal arc welding in this accumulation of flux.

The present invention has been made based on the aforementioned findings. More specifically, in the method of the present invention, the conventional metal arc welding process is applied, which comprises using direct electric current supplied to a plurality of consumable electrodes in tandem through cables as the welding current. Furthermore, at least two even-numbered consumable electrodes are used, half of said consumable electrodes being connected in the reverse-polarity manner, i.e., to be positive in polarity, and the remaining half being connected in the straight-polarity manner, i.e., to be negative in polarity. As shown in the schematic side view of FIG. 5, a boom 2, having a length at least equal to that of a pipe-blank 3 to be welded, equipped with a leading welding torch 1a and a trailing welding torch 1b in tandem at the free end thereof, the fixed end thereof being fixed to a carriage (not shown in the drawing), is inserted in advance into said pipe-blank 3 together with cables 9a and 9b. A leading consumable electrode 5a fed through said leading welding torch 1a is connected via said cable 9a in the reverse-polarity manner, i.e., to be positive in polarity, and a trailing consumable electrode 5b fed through said trailing welding torch 1b is connected via said cable 9b in the straight-polarity manner, i.e., to be negative in polarity. Said pipe-blank 3 is longitudinally seam-welded from the inside along the groove in the welding direction as indicated by an arrow 14 in the drawing, by applying the GMA welding process on the side of said leading consumable electrode 5a, i.e., the reverse-polarity consumable electrode 5a and applying the submerged-arc welding process on the side of said trailing consumable electrode 5b. i.e., the straight-polarity consumable electrode 5b, while withdrawing said boom 2, together with said cables 9a and 9b, from said pipe-blank 3 in the welding direction as indicated by the arrow 14 (this method is hereinafter called "the first embodiment" of the present invention).

Figure 5:
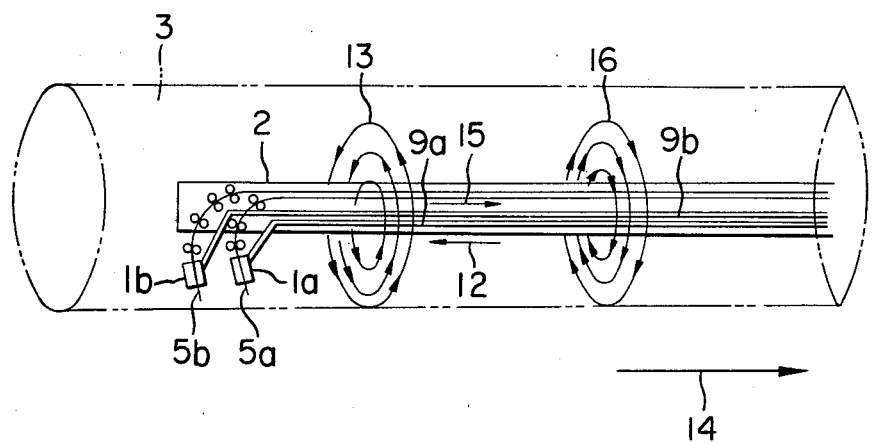
FIG. 5 is a schematic side view illustrating an embodiment of the method of the present invention.

In the aforementioned method of the first embodiment of the present invention, as shown in FIG. 5, the direct electric current flowing through the cable 9a flows in the direction as indicated by an arrow 12 from right to left toward the consumable electrode 5a in the drawing. A clockwise line of magnetic force 13 as viewed from the right-hand side of the drawing is therefore produced by said direct electric current. On the other hand, the direct electric current flowing through the cable 9b flows in the direction as indicated by an arrow 15 from left to right from the consumable electrode 5b in the drawing. A counter-clockwise line of magnetic force 16, just reverse in the direction to said line of magnetic force 13, as viewed from the right-hand side of the drawing, is therefore produced by said direct electric current. Consequently, because of the difference in polarity between the leading consumable electrode 5a and the trailing consumable electrode 5b, the direction of the line of magnetic force 13 is opposite to that of the line of magnetic force 16. Therefore, said lines of magnetic force 13 and 16 cancel each other, and as a result, said pipeblank 3 is hardly magnetized. It is thus possible to fully prevent occurrence of the magnetic arc blow of the welding arc and the resulting irregular weld bead and welding defects such as undercut of bead, humping bead, lack of fusion of base metal and spattering.

As mentioned above, in the method of the present invention, the submerged-arc welding process is applied on the side of the trailing consumable electrode 5b, i.e., the straight-polarity consumable electrode 5b connected to be negative in polarity. Therefore, all molten droplets splashed on the side of the straight-polarity consumable electrode by the strong pushing-up force intrinsic to a straight-polarity welding arc, are absorbed in a molten slag of flux and are not deposited on the surface of the weld bead as spatters, thus leading to a beautiful and sound weld free from welding defects. Furthermore, since the leading consumable electrode 5a is connected in the reverse-polarity manner, i.e., to be positive in polarity in the present invention, better results can be obtained, because of the easy availability of a deeper fusion penetration required on the side of the leading consumable electrode.

The magnetization of a pipe-blank can be prevented also by another embodiment of the method of the present invention, which comprises, also with reference to FIG. 5, connecting, contrary to the foregoing, the consumable electrode 5a in the straight-polarity manner, i.e., to be negative in polarity, and the consumable electrode 5b, in the reverse-polarity manner, i.e., to be positive in polarity; and longitudinally seam-welding the pipe-blank 3 from the inside along the groove in the direction opposite to that indicated by the arrow 14, by applying the GMA welding process on the side of said consumable electrode 5b, i.e., the reverse-polarity consumable electrode 5b and applying the submerged-arc welding process on the side of said consumable electrode 5a, i.e., the straight-polarity consumable electrode 5a, while inserting the boom 2, together with the cables 9a and 9b, into said pipe-blank 3 from the right-hand side of the drawing by the carriage (not shown in the drawing); thereby preventing magnetic arc blow of the welding arc and the resulting irregular weld bead and weld defects. In this case, it goes without saying that the consumable electrode 5b is the leading electrode, and the consumable electrode 5a, the trailing electrode (this method is hereinafter called "the second embodiment" of the present invention).

Now, the method of the present invention is described more in detail by way of an example.

EXAMPLE

In longitudinally seam-welding two pipe-blanks for welded steel pipe, from the inside along a groove, having a wall thickness of 1 inch, an outside diameter of 48 inches and a length of 12 meters by the tandem-headed metal arc welding process which comprises using direct electric current supplied to two leading and trailing consumable electrodes through cables as the welding current, the welding method of the first embodiment of the present invention described above with reference to FIG. 5 was applied to one of the pipe-blanks, said welding method comprising also with reference to FIG. 5, inserting the boom 2 in advance into the pipe-blank 3 together with the cables 9a and 9b, said boom 2 being equipped with the leading welding torch 1a and the trailing welding torch 1b in tandem at the free end thereof and being fixed to the carriage (not shown in the drawing) at the fixed end thereof; connecting the leading consumable electrode 5a fed through said leading welding torch 1a in the reverse-polarity manner, i.e., to be positive in polarity via said cable 9a; connecting the trailing consumable electrode 5b fed through said trailing welding torch 1b in the straight-polarity manner, i.e., to be negative in polarity via said cable 9b; and longitudinally seam-welding said pipe-blank 3 from the inside along the groove in the direction as indicated by the arrow 14 in the drawing, by applying the GMA welding process on the side of said leading consumable electrode 5a, i.e., the reverse-polarity consumable electrode 5a and applying the submerged-arc welding process on the side of said trailing consumable electrode 5b, i.e., the straight-polarity consumable electrode 5b, while withdrawing said boom 2, together with said cables 9a and 9b, from said pipe-blank by said carriage in the same direction as that of welding indicated by the arrow 14.

On the other hand, the welding method which is outside the scope of the present invention was applied to the other pipe-blank for comparison purposes, said method comprising connecting both of the leading consumable electrode and the trailing consumable electrode reversely in polarity with respect to each other, and applying the GMA welding process on both sides of said leading and trailing consumable electrodes.

Figure 6:
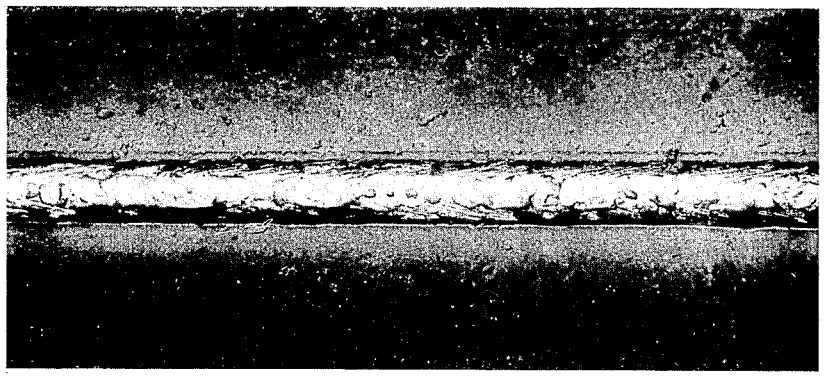
FIG. 6 is a photograph showing the state of a weld bead obtained by the GMA welding process, which is outside the scope of the present invention, and in which leading and trailing consumable electrodes are connected reversely in polarity with respect to each other.
Figure 7:
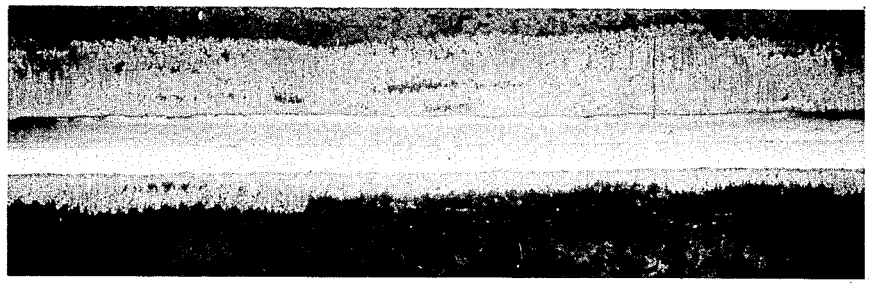
FIG. 7 is a photograph showing the state of a weld bead obtained by a method of the present invention.

The states of the weld beads obtained as a result are shown in photographs of FIGS. 6 and 7.

In the weld bead obtained by the GMA welding process, which is outside the scope of the present invention, and in which both of the leading consumable electrode and the trailing consumable electrode are connected reversely in polarity with respect to each other, as shown in the photograph of FIG. 6, not only the appearance is poor, the X-ray test revealed such welding defects as lack of fusion of base metal and undercut of bead. This is beacuse the strong pushing-up force intrinsic to a straight-polarity welding arc blows off molten droplets from the straight-polarity consumable electrode to above the tip of said consumable electrode in the form of spatters, which are deposited on the weld bead surface and the surroundings.

The weld bead obtained by the welding method of the first embodiment of the present invention, in contrast, has a beautiful appearance as shown in the photograph of FIG. 7, with no trace of welding defects observed even by the X-ray test and the ultrasonic flaw detection, thus permitting ascertainment that a very sound weld can be obtained by the welding method of the first embodiment of the present invention.

Similarly good results have been obtained also by the welding method of the second embodiment of the present invention, which comprises, also with reference to FIG. 5, connecting, contrary to the foregoing, the consumable electrode 5a in the straight-polarity manner, i.e., to be negative in polarity, and the consumable electrode 5b, in the reverse-polarity manner i.e., to be positive in polarity; and longitudinally seam-welding the pipe-blank 3 from the inside along the groove in the direction opposite to that indicated by the arrow 14, by applying the GMA welding process on the side of said consumable electrode 5b, i.e., the reverse-polarity consumable electrode 5b and applying the submerged-arc welding process on the side of said consumable electrode 5a, i.e., the straight-polarity consumable electrode 5a, while inserting the boom 2, together with the cables 9a and 9b, into said pipe-blank 3 from the right-hand side of the drawing by the carriage (not shown in the drawing). In this case, the consumable electrode 5b is the leading electrode, and the consumable electrode 5a, the trailing electrode.

The above description of the method of the present invention has covered only the case where a pipe-blank is fixed while moving only a boom equipped with welding torches in tandem. The essential requirement in the present invention is however in that the welding torches move in the welding direction. Therefore, the method of the present invention covers also cases in which the pipe-blank is moved while fixing the boom equipped with the welding torches. In other words, in the method of the present invention, it suffices to move the boom equipped with the welding torches through said pipe-blank relative thereto in the same direction as that of welding.

According to the method of the present invention, as described above in detail, it is possible to fully prevent not only the occurrence of the magnetization of the pipe-blank caused by the direct electric current flowing through the current supply cables introduced into said pipe-blank and the resulting magnetic arc blow of the welding arc, but also the occurrence of spattering on the side of the straight-polarity consumable electrode caused by the strong pushing-up force intrinsic to the straight-polarity welding arc, and therefore to obtain a beautiful and sound weld bead, thus providing industrially useful effects.

What is claimed is:

1. In a welding method for longitudinally seam-welding a pipe-blank from the inside thereof using the metal arc welding process comprising supplying direct electric current as the welding current to a plurality of consumable electrodes in tandem through at least one cable, feeding said respective consumble electrodes through a respective plurality of welding torches in tandem, while moving a boom carrying said welding torches through said pipe-blank relative to said pipe-blank in the same direction as that of welding, said boom having a free end which carries said welding torches and having a length at least equal to that of said pipe-blank, the improvement comprising:
providing at least two consumable electrodes, said electrodes being provided in an even number;
connecting half of said at least two consumable electrodes to a source of power so as to be positive in polarity and arranging said half of said electrodes as the leading electrodes in the direction of welding;
connecting the remaining half of said at least two consumable electrodes to a source of power so as to be negative in polarity, and arranging said remaining half of said electrodes as the trailing electrodes in the direction of welding;
applying the GMA welding process on the side of said leading positive polarity consumable electrodes; and
applying the submerged-arc welding process on the side of said trailing negative polarity consumable electrodes;
thereby preventing magnetization of said pipe-blank and the resulting magnetic arc blow of the welding arc by causing lines of magnetic force produced by said direct electric current for welding flowing through said at least one cable introduced into said pipe-blank to cancel each other, and also preventing spattering of molten droplets from said negative polarity consumable electrodes.

2. In the method as claimed in claim 1, the improvement further comprising inserting said boom in advance into said pipe-blank together with said at least one cable, and longitudinally seam-welding said pipe-blank while with-drawing said boom, together with said at least one cable, from said pipe-blank relative thereto in the same direction as that of welding.

3. In the method as claimed in claim 1, the improvement further comprising longitudinally seam-welding said pipe-blank while inserting said boom into said pipe-blank relative thereto, together with said at least one cable, in the same direction as that of welding.

* * * * *